United States Patent
Takeuchi

(10) Patent No.: US 9,774,655 B2
(45) Date of Patent: Sep. 26, 2017

(54) SERVER AND METHOD FOR TRANSFERRING AN OBJECT BETWEEN USERS IN A SERVICE PROVIDED BY THE SERVER

(71) Applicant: GREE, Inc., Minato-ky, Tokyo (JP)

(72) Inventor: Masaru Takeuchi, Minato-ku (JP)

(73) Assignee: GREE, Inc., Minato-ku (JP)

( * ) Notice: Subject to any disclaimer, the term of this patent is extended or adjusted under 35 U.S.C. 154(b) by 245 days.

(21) Appl. No.: 14/428,251

(22) PCT Filed: Sep. 17, 2013

(86) PCT No.: PCT/JP2013/075047
§ 371 (c)(1),
(2) Date: Mar. 13, 2015

(87) PCT Pub. No.: WO2014/046092
PCT Pub. Date: Mar. 27, 2014

(65) Prior Publication Data
US 2015/0256596 A1  Sep. 10, 2015

(30) Foreign Application Priority Data
Sep. 20, 2012 (JP) .................... 2012-206705

(51) Int. Cl.
*G06F 3/048* (2013.01)
*H04L 29/08* (2006.01)
(Continued)

(52) U.S. Cl.
CPC .......... *H04L 67/06* (2013.01); *G06F 3/04842* (2013.01); *G06Q 30/0241* (2013.01);
(Continued)

(58) Field of Classification Search
CPC ...... H04L 67/06; H04L 67/20; G06F 3/04842
See application file for complete search history.

(56) References Cited

U.S. PATENT DOCUMENTS 7,594,179 B2 * 9/2009 Takemura ........... H04L 12/2803
715/706
8,821,288 B2 * 9/2014 Shimono ................. A63F 13/92
463/16
(Continued)

FOREIGN PATENT DOCUMENTS

JP  2007-328702  12/2007
JP  2008-217142  9/2008

OTHER PUBLICATIONS

English translation of Written Opinion of the International Searching Authority for corresponding International Application No. PCT/JP2013/075047, mailed Oct. 8, 2013, 3pp.
(Continued)

*Primary Examiner* — Omar Abdul-Ali
(74) *Attorney, Agent, or Firm* — Oblon, McClelland, Maier & Neustadt, L.L.P.

(57) ABSTRACT

A server including a first storage module for storing possessed objects of a first user and a second user, a communication module for receiving from a device of the first user a request for transfer of an object from the first user to the second user, a second storage module for storing an object transfer relationship between the first user and the second user in response to the request for transfer, and a benefit granting module for granting a predetermined benefit to the second user if a condition for granting a benefit in relation to an object transfer relationship of the second user with other users is satisfied when an object is transferred in response to the request for transfer.

8 Claims, 12 Drawing Sheets

(51) Int. Cl.
   *G06Q 30/02*    (2012.01)
   *G06F 3/0484*   (2013.01)
   *H04L 29/06*    (2006.01)
(52) U.S. Cl.
   CPC .............. *H04L 63/10* (2013.01); *H04L 67/10* (2013.01); *H04L 67/20* (2013.01)

(56) References Cited

U.S. PATENT DOCUMENTS

| | | | | |
|---|---|---|---|---|
| 2009/0100076 | A1* | 4/2009 | Hamilton, II | G06Q 30/02 |
| 2009/0204628 | A1* | 8/2009 | Bhogal | A63F 13/12 |
| 2009/0292591 | A1* | 11/2009 | Schultz | G06Q 20/0453 |
| | | | | 705/39 |
| 2009/0313556 | A1* | 12/2009 | Hamilton, II | G06F 21/105 |
| | | | | 715/757 |
| 2010/0280919 | A1* | 11/2010 | Everett | A63F 13/12 |
| | | | | 705/27.2 |
| 2012/0110477 | A1* | 5/2012 | Gaume | G06Q 50/01 |
| | | | | 715/757 |
| 2012/0197692 | A1* | 8/2012 | Ganz | G06Q 30/0207 |
| | | | | 705/14.1 |
| 2013/0275886 | A1* | 10/2013 | Haswell | G06Q 30/0241 |
| | | | | 715/757 |

OTHER PUBLICATIONS

International Search Report for International Application No. PCT/JP2013/075047, mailed Oct. 8, 2013, 1pg.

Miho Norma, Hito wa Naze Katachi no nai Mono o Kaunoka, 1st edition, NTT Publishing Co., Ltd., Oct. 3, 2008, pp. 115-120.

* cited by examiner

FIG. 4A

| USER | PASSWORD | ATTRIBUTE | AVATAR | POSSESSED ITEM | WEARING ITEM | POSTED MESSAGE | FRIEND |
|---|---|---|---|---|---|---|---|
| USER 1 | *** | GENDER=MALE, ... | AVATAR 1 | ITEM 1, ... | ITEM 1, ... | MESSAGE 1, ... | USER 2, ... |
| USER 2 | *** | GENDER=FEMALE, ... | AVATAR 2 | ITEM 2, ... | ITEM 2, ... | MESSAGE 2, ... | USER 1, ... |
| USER 3 | *** | GENDER=MALE, ... | AVATAR 3 | ITEM 3, ... | ITEM 3, ... | MESSAGE 3, ... | USER 1, ... |
| ⋮ | ⋮ | ⋮ | ⋮ | ⋮ | ⋮ | ⋮ | ⋮ |

FIG. 4B

| TRANSFEROR USER | | TRANSFEREE USER | | | |
|---|---|---|---|---|---|
| | | USER 1 | USER 2 | USER 3 | ⋮ |
| | USER 1 | — | 1 | 1 | ⋮ |
| | USER 2 | 1 | — | 0 | ⋮ |
| | USER 3 | 0 | 0 | — | ⋮ |
| | ⋮ | ⋮ | ⋮ | ⋮ | — |

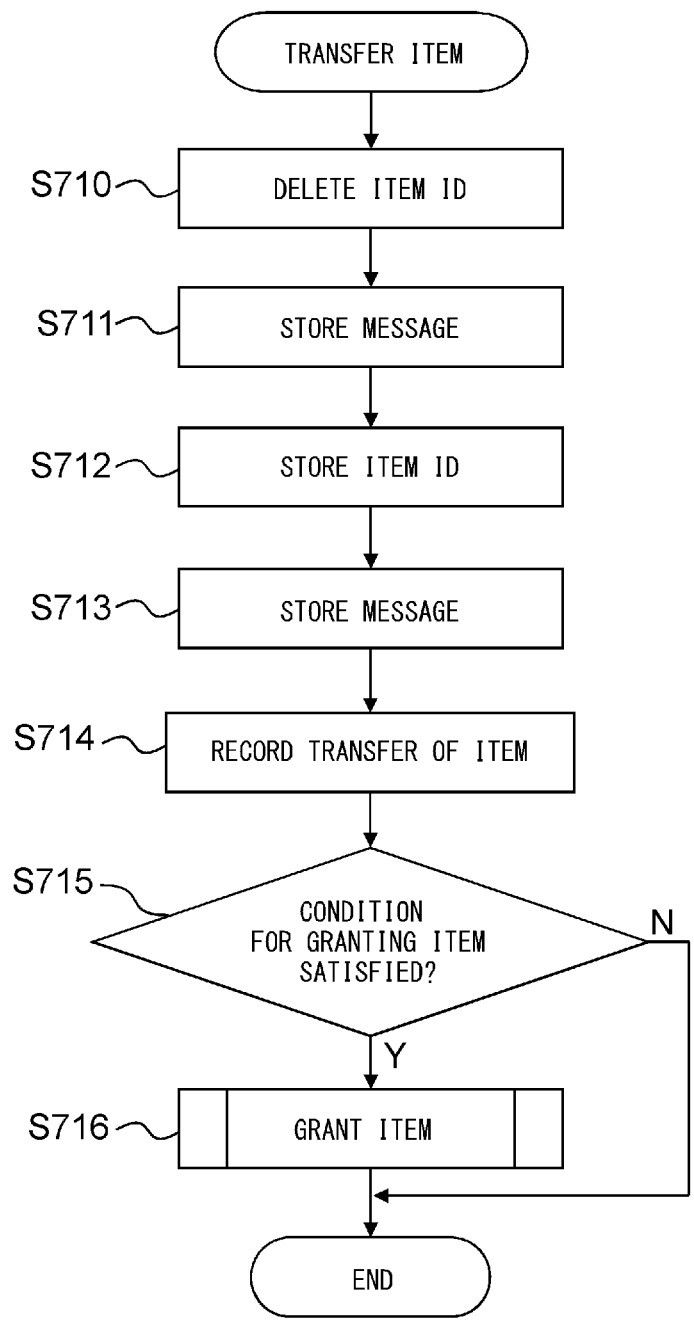

SERVER AND METHOD FOR TRANSFERRING AN OBJECT BETWEEN USERS IN A SERVICE PROVIDED BY THE SERVER

CROSS-REFERENCE TO RELATED APPLICATION

This application is a National Phase Patent Application and claims the priority of International Application Number PCT/JP2013/075047, filed on Sep. 17, 2013, which claims priority to Japanese Application No. JP 2012-206705, filed Sep. 20, 2012. The disclosures of which are hereby incorporated by reference.

TECHNICAL FIELD

This application relates to a server, a method for controlling the server, and a control program for the server.

BACKGROUND

With the widespread use of the Internet throughout the general public, there has been a rapid increase not only in passive users who browse the Web and search for information or purchase commodities online, but also in active users who publish quasi-diaries (hereinafter referred to as a "blog") on the Web or form user communities that share common interests. The spread of blogs throughout the general public represents an emergence and rapid growth of societies on the networks (hereinafter referred to as a "network community"), which are different from the real world and were unimaginable when people were browsing the Web on terminal devices having the capability to connect to the networks.

Under these circumstances, more and more users are using avatars that represent themselves on networks. An avatar, which means "alter ego", is specifically a so-called character expressed by image data, video data, audio data, or the like; it is acquiring its significance of existence as a pseudo-acting entity in various activities where a user expresses himself/herself, talks, sympathizes or discusses with other users, or builds friendship with people having a common interest in network communities that exist apart from the real world.

Coordinating an avatar's items including hair styles, clothes, accessories, goods, and backgrounds is now one of important activities for a user to draw attention to his/her own senses and preferences in a network community. Users are thus getting or buying these items or giving them to their friends as gifts, which means coordinating avatar items is now one target of economic activity (Patent Literature 1, for example).

CITATION LIST

Patent Literature

Patent Literature 1: Japanese Laid-open Publication No. 2007-328702

SUMMARY

Technical Problem

A variety of items are made available on provider sites including free or paid items. Generally, paid items are of better design, rarer, and more eye-catching, and thus very useful in coordinating items for an avatar. However, free items are often sufficient for the coordinates, and thus only a limited number of users are willing to buy paid items and further give them to their friends as gifts.

Under these circumstances, one conventional way to encourage a user to buy or give as gifts the items is to provide the user with a predetermined incentive. For example, one incentive may be giving one special item to the user who has bought two items as gifts. However, its effect has some definite limit.

It is an object of this application to provide a server, a method for controlling the server, and a control program for the server that can further encourage users to purchase items or give them as gifts, so as to solve these conventional problems.

Solution Problem

According to an aspect of the device, there is provided a server. The server including a first storage module for storing possessed objects of a first user and a second user, a communication module for receiving from a device of the first user a request for transfer of an object from the first user to the second user, a second storage module for storing an object transfer relationship between the first user and the second user in response to the request for transfer, and a benefit granting module for granting a predetermined benefit to the second user if a condition for granting a benefit in relation to an object transfer relationship of the second user with other users is satisfied when an object is transferred in response to the request for transfer.

Preferably, the condition for granting a benefit includes a condition relating to the number of users who have transferred an object to the second user.

Preferably, the condition for granting a benefit includes a condition relating to the number of users who, among those users to whom the second user transferred any object, have transferred an object to the second user.

Preferably, the condition for granting a benefit includes a condition relating to an attribute of a user who has transferred an object to the second user.

Preferably, the condition for granting a benefit includes a condition relating to the number of and/or types of objects which have been transferred to the second user.

Preferably, the condition for granting a benefit includes a condition relating to a point of time or a period when an object is transferred.

Preferably, the predetermined benefit is a predetermined object.

According to an aspect of the method, there is provided a method for controlling a server including a first storage module for storing possessed objects of a first user and a second user, and a second storage module for storing an object transfer relationship between the first user and the second user in response to a request for transfer of an object from the first user to the second user. The method including receiving, by the server, the request for transfer from a device of the first user, and granting, by the server, a predetermined benefit to the second user if a condition for granting a benefit in relation to an object transfer relationship of the second user with other users is satisfied when an object is transferred in response to the request for transfer.

According to an aspect of the computer program, there is provided a control program for a server including a first storage module for storing possessed objects of a first user and a second user, and a second storage module for storing an object transfer relationship between the first user and the second user in response to a request for transfer of an object from the first user to the second user. The control program causes the server to execute a process. The process including receiving the request for transfer from a device of the first user, and granting a predetermined benefit to the second user if a condition for granting a benefit in relation to an object transfer relationship of the second user with other users is satisfied when an object is transferred in response to the request for transfer.

Advantageous Effects of Invention

In general, a human being feels like returning the favor when given a present. The feelings get much stronger for a more expensive, rarer, or larger amount of present. Therefore, a server, a method for controlling the server, and a control program for the server according to the embodiment enhance such feelings of a transferee user, when an item is transferred to the transferee in response to a request for transfer, by determining whether a benefit granting condition in relation to item transfer relationships between the transferee and other users is satisfied or not, and by granting a predetermined benefit to the transferee user if the condition is satisfied. It is expected that the transferee user, who is granted a benefit as well as given a present, returns the favor by purchasing an item. Additionally, it is expected that the presenter user aggressively purchases and gives items as gifts in expectation of the returned favor and benefits. In this way, users can be further encouraged to purchase items or give them as gifts.

BRIEF DESCRIPTION OF THE DRAWINGS

FIG. 4A illustrates an example data structure in one of various tables.

FIG. 4B illustrates an example data structure in one of various tables.

FIG. 7B illustrates an example operational flow for the server processing module.

DESCRIPTION OF EMBODIMENTS

Hereinafter, with reference to the drawings, a method for forming a game medium group, a computer-readable, non-transitory medium, and a computer will be described. It should be noted that the technical scope of the present invention is not limited to embodiments of the invention but covers the invention described in the claims and its equivalent.

First Embodiment

The first embodiment is applied to a social networking service (hereinafter referred to as "SNS"). SNS, a community-type Web site to help connect users, is a service that provides ways to promote smooth communications among users or to build new human relations. For example, information about a user (e.g., his/her user name, avatar, recent events, messages, and diaries) is sent to the user and other users who are in a friend relationship with the user, and such other users may give comments or evaluations about the information (e.g., "like") so that users can communicate with one another.

In such SNS, a portable device sends to a server a request for transfer of an item to another user, in response to an instruction from a user. Upon receipt of the request from the portable device, the server transfers an item to the other user. In addition, if a predetermined condition for granting an item is satisfied with regard to the other user owing to the item transfer, the server grants the predetermined item to the other user.

Figure 1:
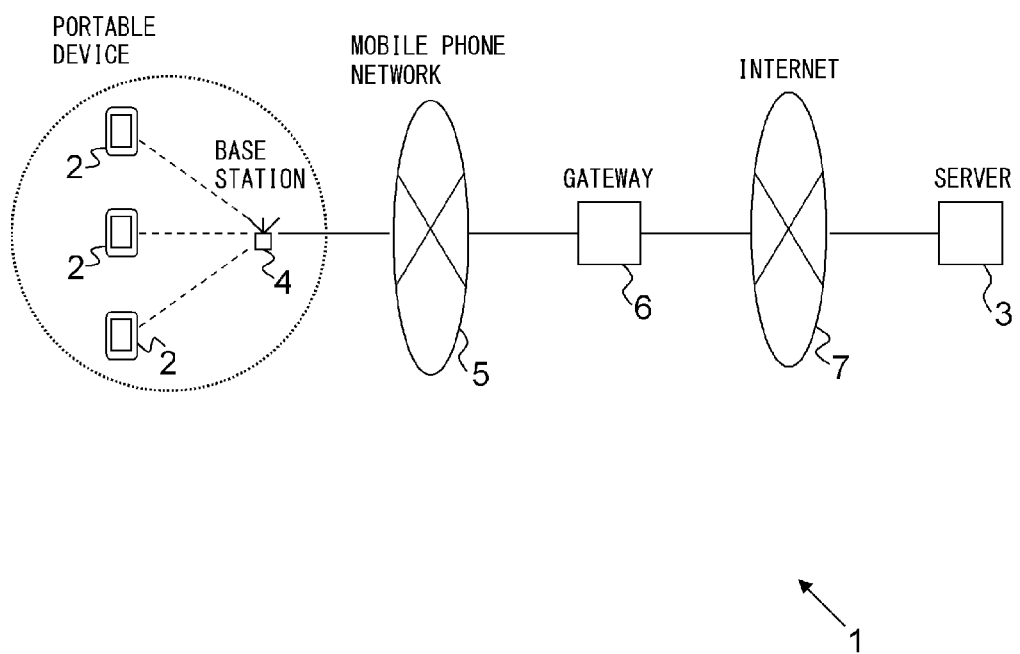
FIG. 1 illustrates an example schematic configuration of a communication system.

FIG. 1 illustrates an example schematic configuration of a communication system 1.

The communication system 1 includes at least one portable device 2 and a server 3. The portable device 2 and the server 3 are connected with each other via a public communication line, a wireless communication line, or any other communication network, for example, via a base station 4, a mobile phone network 5, a gateway 6, and the Internet 7. A program executed on the portable device 2 (e.g., a web browser program) and a program executed on the server 3 (e.g., a web server program) communicate with each other according to a communications protocol such as Hypertext Transfer Protocol (HTTP).

Figure 2:
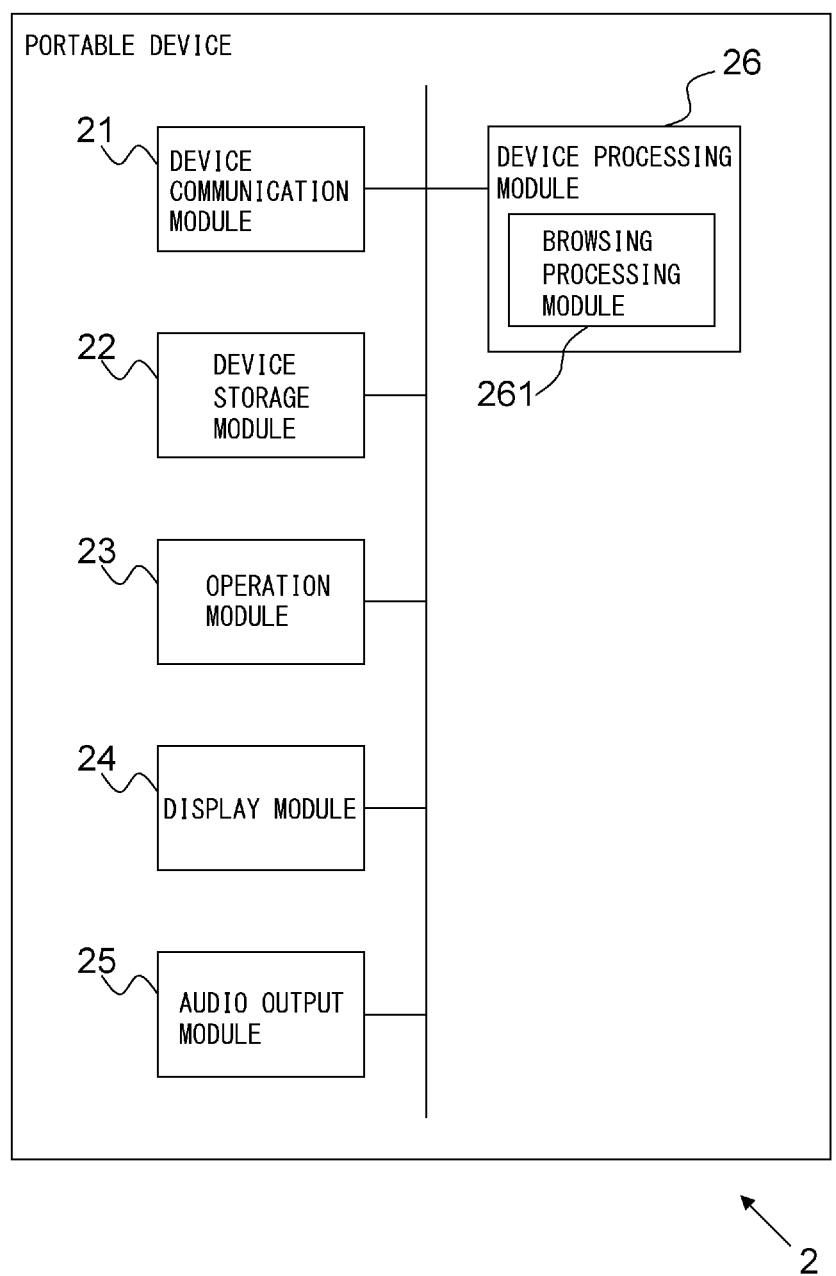
FIG. 2 illustrates an example schematic configuration of a portable device.

FIG. 2 illustrates an example schematic configuration of the portable device 2.

The portable device 2 connects to, and communicates with, the server 3 via the base station 4, mobile phone network 5, gateway 6, and Internet 7. The portable device 2 sends a request for purchasing or transferring an item or posting a message to the server 3, in response to an operation on the operation module 23 (a button and the like) performed by a user. In addition, the portable device 2 receives display data from the server 3 relevant to the request and causes the data to be appropriately displayed. For these purposes, the portable device 2 includes a device communication module 21, a device storage module 22, an operation module 23, a display module 24, an audio output module 25, and a device processing module 26.

The device communication module 21 includes a communication interface circuit so as to connect the portable device 2 to the mobile phone network 5. The device communication module 21 establishes a wireless signal line with the base station 4 over a channel allocated by the base station 4 by using a method such as Code Division Multiple Access (CDMA) to communicate with the base station 4. The device communication module 21 receives information through the mobile phone network 5 from the server 3 connected to the Internet 7, and gives the received information to the device processing module 26. In addition, the device communication module 21 sends the information given by the device processing module 26 to the server 3 through the mobile phone network 5 and through the Internet 7.

The device storage module 22 includes, for example, at least one of the following devices: a semiconductor memory device, a magnetic disk device, and an optical disk device. The device storage module 22 stores operating system programs, application programs, data, and the like which are used for processing performed by the device processing module 26. For example, the device storage module 22 stores application programs, such as a web browser program for retrieving and displaying web pages and an e-mail program for sending and receiving electronic mail. Furthermore, the device storage module 22 stores data, such as an identification number (ID) of the portable device 2, payment data used for purchasing an item (e.g., credit card number), display data, video data, image data, and audio data received from the server 3. Additionally, the device storage module 22 may temporarily store temporary data involved in predetermined processes.

The operation module 23 may be any device that can be used for operating the portable device 2, such as a touchpad or a keyboard. The user can use this device to enter alphanumeric or other characters. The operation module 23, when operated by the user, generates a signal corresponding to the operation. The generated signal is input to the device processing module 26 as an instruction from the user.

The display module 24 may be any device that is capable of displaying video images, picture images, and the like, such as a liquid crystal display or an organic electro-luminescence (EL) display. The display module 24 displays images corresponding to video or picture image data based on image data given by the device processing module 26.

The audio output module 25 may be any device that is capable of outputting sounds, such as a speaker or headphones. The audio output module 25 outputs sounds corresponding to audio data given by the device processing module 26.

The device processing module 26 includes one or more processors and peripheral circuitry thereof. The device processing module 26 is a module, such as a central processing unit (CPU), which provides a centralized control over general operations of the portable device 2. In other words, the device processing module 26 controls operations of the device communication module 21, the display module 24, the audio output module 25, and the like so that various processes in the portable device 2 may be carried out according to appropriate procedures based on a program stored in the device storage module 22 or an operation performed on the operation module 23. The device processing module 26 carries out processes based on programs (operating system programs, application programs, or the like) stored in the device storage module 22. In addition, the device processing module 26 has the capability to execute two or more programs (such as application programs) in parallel.

The device processing module 26 at least includes a browsing processing module 261. The respective modules are functional modules implemented by programs that are executed on the processor included in the device processing module 26. Alternatively, the respective modules may be implemented in the portable device 2 in the form of firmware.

In response to an instruction from the user, the browsing processing module 261 sends a request for retrieving display data to the server 3 through the device communication module 21. The browsing processing module 261 then receives the corresponding display data from the server 3 through the device communication module 21. The browsing processing module 261 creates rendering data based on the received display data. In other words, the browsing processing module 261 analyzes the received display data, identifies both control data and content data contained in the display data, and lays out the identified content data according to the identified control data to create the rendering data. The browsing processing module 261 outputs the created rendering data to the display module 24.

Figure 3:
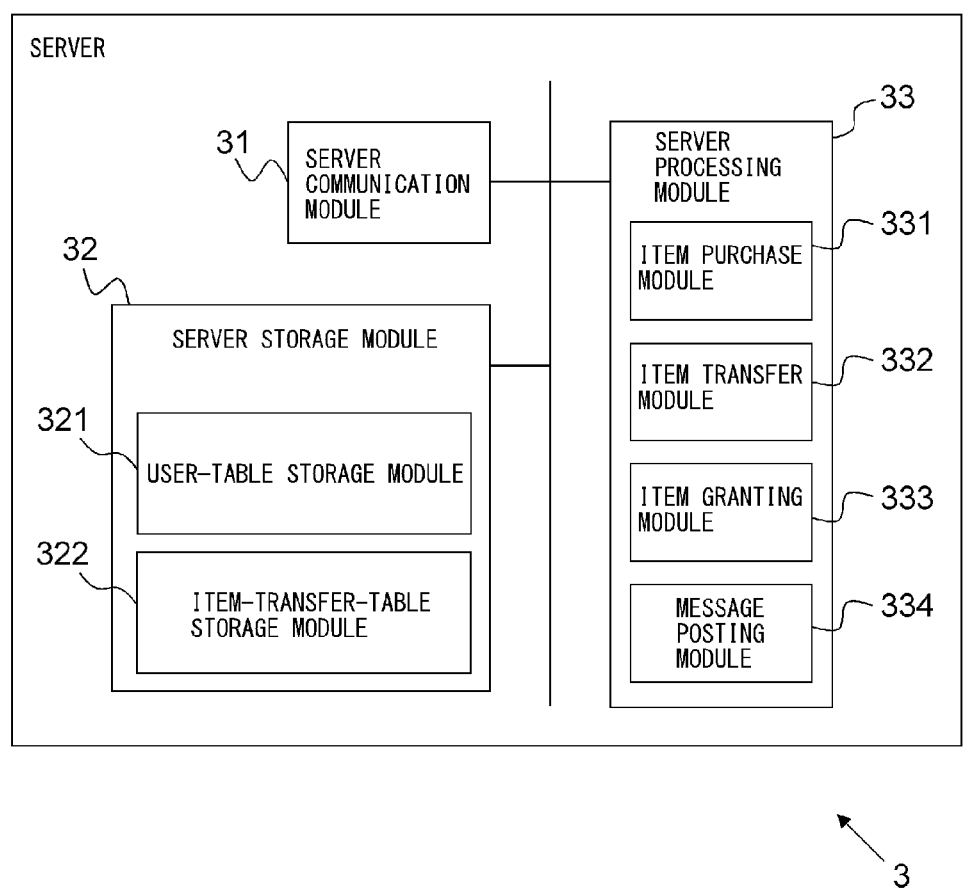
FIG. 3 illustrates an example schematic configuration of a server.

FIG. 3 illustrates an example schematic configuration of the server 3.

The server 3 manages the user's avatar, possessed items, posted messages, and other users in a friend relationship with the user. In addition, the server 3, in response to a request from the portable device 2, creates data for displaying a home screen of the user and sends the data to the portable device 2. For these purposes, the server 3 includes a server communication module 31, a server storage module 32, and a server processing module 33.

The server communication module 31 includes a communication interface circuit so as to connect the server 3 to the Internet 7. The server communication module 31 receives information through the Internet 7 from the portable device 2 that is connected to the mobile phone network 5, and gives the received information to the server processing module 33. In addition, the server communication module 31 sends the information given by the server processing module 33 to the portable device 2 through the Internet 7 and through the mobile phone network 5.

The server storage module 32 includes, for example, at least one of the following devices: a semiconductor memory device, a magnetic disk device, and an optical disk device. The server storage module 32 stores operating system programs, application programs, data, and the like which are used for processing performed by the server processing module 33. For example, the server storage module 32 stores application programs, such as a program that manages the user's avatar, possessed items, posted messages, friends, and the like and that creates and outputs data for displaying the user's home screen. Furthermore, the server storage module 32 stores data, such as a user table for managing users (FIG. 4A), an item table for managing items, an image table for managing images, image data, and an item transfer table for managing transfers of items (FIG. 4B). The user table stores, for each user, authentication data (e.g., identification number (hereinafter referred to as "user ID") and password), attribute values (e.g., age, gender, and living place (country)), the identification number for the used avatar (hereinafter referred to as "avatar ID"), the identification number for the user's possessed item (hereinafter referred to as "item ID"), the item ID for the user's wearing item, text data for a posted message, and a user ID of the user's friend, and the like. The item table stores, for each item, the item ID and price. The image table stores every image's elements such as the avatar ID and/or item ID, the place of image data (e.g., URL (Uniform Resource Locator)), and the like. The item transfer table stores, for each combination of transferor and transferee users, whether an item is transferred or not, and the like. The user table and the item transfer table are stored into the user-table storage module 321 and the item-transfer table storage module 322, respectively, both of which modules are included in the server storage module 32. Additionally, the server storage module 32 may temporarily store temporary data involved in predetermined processes.

The server processing module 33 includes one or more processors and peripheral circuitry thereof. The server processing module 33 is a module, such as a central processing unit (CPU), which provides a centralized control over general operations of the server 3. In other words, the server processing module 33 controls operations of the server communication module 31 so that various processes in the server 3 may be carried out according to appropriate procedures based on a program or the like stored in the server storage module 32. The server processing module 33 carries out processes based on programs (operating system programs, application programs, or the like) stored in the server storage module 32. In addition, the server processing module 33 has the capability to execute two or more programs (such as application programs) in parallel.

The server processing module 33 includes an item purchase module 331, an item transfer module 332, an item granting module 333, and a message posting module 334. The respective modules are functional modules implemented by programs that are executed on the processor included in the server processing module 33. Alternatively, the respective modules may be implemented in the server 3 in the form of firmware.

Upon receipt of a request for user authentication with the parameters: a user ID, password, and the like, from the portable device 2 through the server communication module 31, the server processing module 33 instructs the user authentication module (not illustrated) to authenticate the user with the parameters: the received user ID and password.

When the user is authenticated by the user authentication module, the server processing module 33 references the user table stored in the server storage module 32 and extracts the avatar ID for the used avatar and item ID for the user's wearing item, using the received user ID as a key (i.e., data used for comparison for search). In addition, the server processing module 33 references the image table stored in the server storage module 32 and extracts URLs for image data, using the extracted avatar ID and item ID as keys. Furthermore, the server processing module 33 references the user table stored in the server storage module 32 and extracts the text data for a posted message, using the received user ID as a key. Then, the server processing module 33 creates the display data for the home screen for displaying the images indicated by the extracted URLs, the text represented by the text data, and buttons or the like to accept instructions to post a message, retrieve an item purchase screen, or retrieve an item transfer screen in a predetermined layout. The server processing module 33 sends the created display data for the home screen to the portable device 2 through the server communication module 31.

FIG. 5 illustrates example screens displayed on the portable device 2.

Figure 5A:
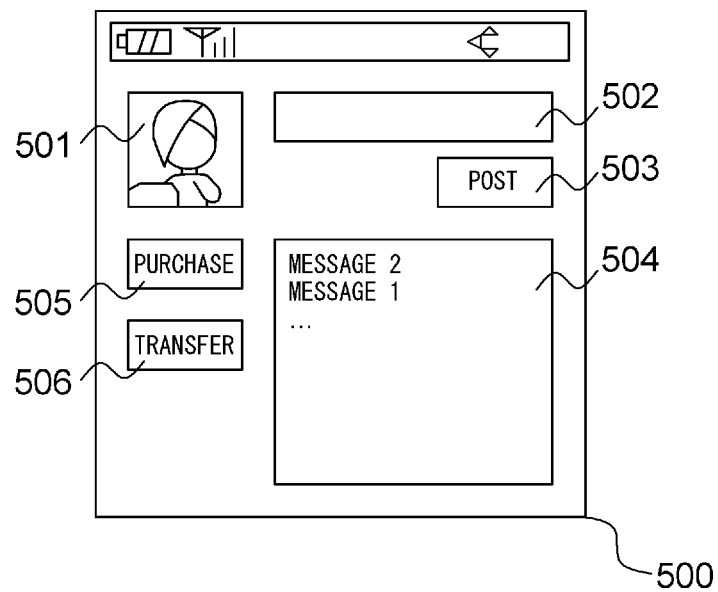
FIG. 5A illustrates an example display screen on the portable device.

FIG. 5A illustrates a home screen 500 which is displayed based on the display data for the home screen. In the upper left area of the home screen 500, the user's avatar image 501 which is wearing predetermined items is displayed. On the right of the home screen 500, an input field for posting a message 502, a Post button 503, and a display field for a posted message 504 are displayed. A request for posting a message is sent to the server 3 through the device communication module 21, by pressing the Post button 503. In the lower left area of the home screen 500, two buttons 505 and 506 are displayed. A request for retrieving an item purchase screen is sent to the server 3 through the device communication module 21, by pressing the Purchase button 505. A request for retrieving an item transfer screen is sent to the server 3 through the device communication module 21, by pressing the Transfer button 506.

Upon receipt of a request for retrieving an item purchase screen from the portable device 2 through the server communication module 31, the server processing module 33 references the item table stored in the server storage module 32 and extracts the item IDs and prices of the respective items, using the previously received user ID as a key. In addition, the server processing module 33 references the image table stored in the server storage module 32 and extracts the URLs for image data, using the extracted item IDs as keys. Then, the server processing module 33 creates the display data for the item purchase screen for displaying the extracted item IDs, prices, images indicated by the URLs, check boxes for accepting selection of an item, a button for accepting an instruction to purchase an item and the like in a predetermined layout. The server processing module 33 sends the created display data for the item purchase screen to the portable device 2 through the server communication module 31.

Figure 5B:
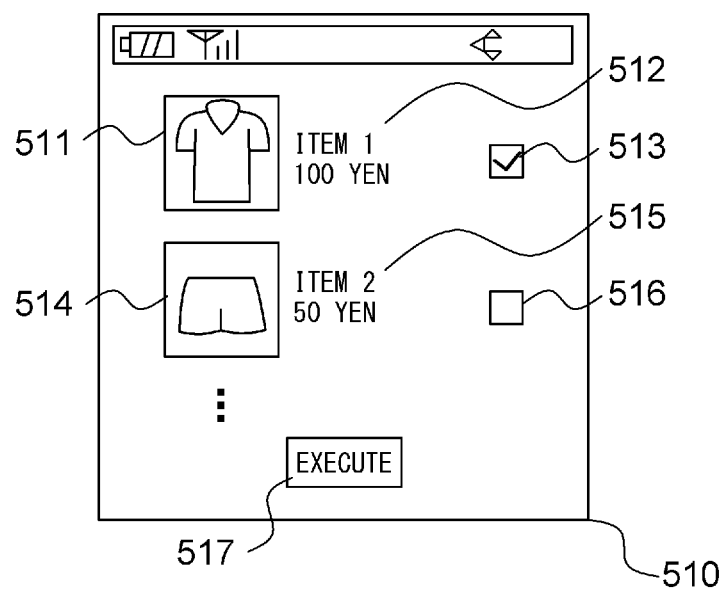
FIG. 5B illustrates an example display screen on the portable device.

FIG. 5B illustrates an item purchase screen 510 which is displayed based on the display data for the item purchase screen. On the left of the item purchase screen 510, a plurality of item images 511 and 514 are displayed with their respective item IDs and prices 512 and 515. On the right of the item purchase screen 510, there are check boxes 513 and 516 for selecting their corresponding items. At the bottom of the item purchase screen 510, an Execute button 517 is displayed. A request for purchasing a selected item is sent to the server 3 through the device communication module 21, by pressing the Execute button.

Upon receipt of a request for purchasing an item with the parameters: an item ID, credit card number, and the like, from the portable device 2 through the server communication module 31, the server processing module 33 instructs the item purchase module 331 to carry out an item purchase process with the parameters: the received item ID and credit card number as well as the previously received user ID.

The item purchase module 331 references the item table stored in the server storage module 32 and extracts the price of the item, using the given item ID as a key. Then, the item purchase module 331 instructs a payment module (not illustrated) to carry out a payment process with the parameters: the extracted price and the given credit card number.

When the payment process is completed by the payment module, the item purchase module 331 references the user table stored in the server storage module 32 and stores the given item ID as a possessed item, using the given user ID as a key. In addition, the item purchase module 331 references the user table stored in the server storage module 32 and stores the text data representing that the user has purchased an item, as a posted message, using the given user ID as a key. Then, the item purchase module 331 exits the item purchase process.

The server processing module 33 creates display data for the home screen. The server processing module 33 sends the created display data for home screen to the portable device 2 through the server communication module 31.

Upon receipt of a request for retrieving an item transfer screen from the portable device 2 through the server communication module 31, the server processing module 33 references the user table stored in the server storage module 32 and extracts the avatar ID for the used avatar, item ID for the user's wearing item, and user ID of the user's friend, using the previously received user ID as a key. In addition, the server processing module 33 references the user table stored in the server storage module 32 and extracts the avatar ID for the used avatar, item ID for the user's wearing item, using the extracted user ID as a key. Furthermore, the server processing module 33 references the image table stored in the server storage module 32 and extracts the URLs for image data, using the extracted avatar ID and item ID as keys.

The server processing module 33 references the user table stored in the server storage module 32 and extracts the item ID for a possessed item, using the previously received user ID as a key. In addition, the server processing module 33 references the image table stored in the server storage module 32 and extracts the URL for image data, using the extracted item ID as a key.

The server processing module 33 creates the display data for the item transfer screen for displaying the image indicated by the extracted URL, the user ID, the item ID, a check box for accepting an instruction to select an item, and buttons for accepting instructions to transfer the item or to select or change the transferee user in a predetermined layout. The display data includes the extracted URL and user ID. The server processing module 33 sends the display data for the created item transfer screen to the portable device 2 through the server communication module 31.

Figure 5C:
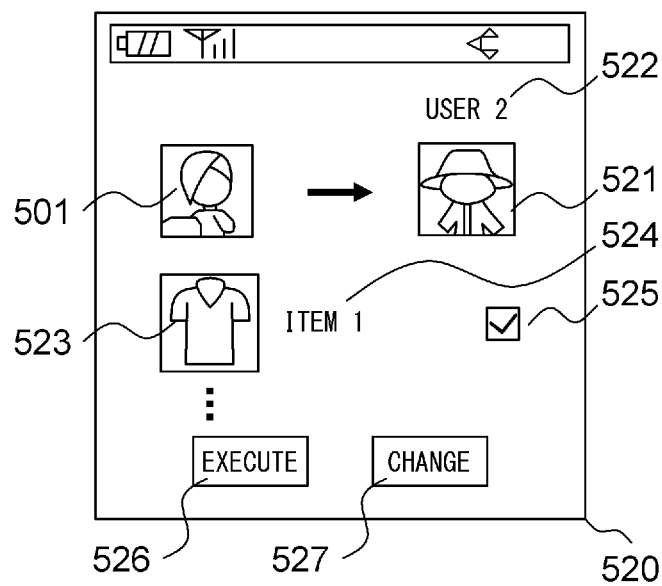
FIG. 5C illustrates an example display screen on the portable device.
Figure 5D:
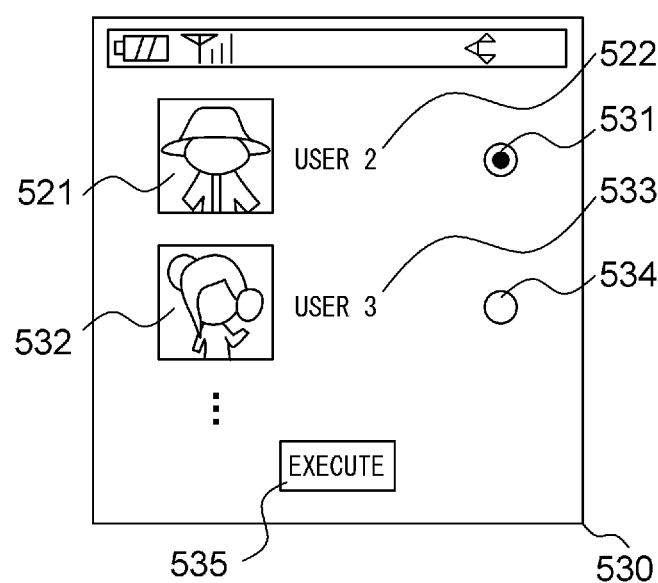
FIG. 5D illustrates an example display screen on the portable device.

FIG. 5C illustrates an item transfer screen 520 which is displayed based on the display data for the created item transfer screen. In the upper area of the item transfer screen, the user's avatar image 501 and the transferee user's avatar image 521 with its user ID 522 are displayed. In the middle left area of the item transfer screen 520, a plurality of item images 523 are displayed with their respective item IDs 524. In the middle right area of the item transfer screen 520, there is a check box 525 for selecting its corresponding item. At the bottom of the item transfer screen 520, there are two buttons 526 and 527. A list of avatar images 521 and 532 of the friends of the user and their user IDs 522 and 533 (FIG. 5D) is displayed by pressing the Change button 527. The friend is selected or changed to as the transferee user by selecting one of the friends (by selecting the radio button 531 or 534 and pressing the Execute button 535). At the same time, a request for transferring the selected item is sent to the selected transferee user to the server 3 through the device communication module 21 by pressing the Execute button 526.

Upon receipt of a request for transferring an item with the parameters: an item ID, an user ID of a transferee user, and the like, from the portable device 2 through the server communication module 31, the server processing module 33 instructs the item transfer module 332 to carry out an item transfer process with the parameters: the received item ID and the user ID of the transferee user as well as the previously received user ID.

The item transfer module 332 references the user table stored in the server storage module 32 and deletes the given item ID from possessed items, using the given user ID as a key. In addition, the item transfer module 332 references the user table stored in the server storage module 32 and stores the text data representing that the user has transferred an item, as a posted message, using the given user ID as a key.

The item transfer module 332 references the user table stored in the server storage module 32 and stores the given item ID as a possessed item, using the given user ID of the transferee user as a key. In addition, the item transfer 332 references the user table stored in the server storage module 32 and stores the text data representing that an item has been transferred, as a posted message, using the given user ID of the transferee user as a key.

The item transfer module 332 references the item transfer table stored in the server storage 32 and records transfer of an item (stores "1", for example), using the given user ID and the user ID of the transferee user as keys. In addition, when a predetermined condition for granting an item is satisfied with regard to the transferee user, the item transfer module 332 instructs the item granting module 333 to carry out an item granting process with the parameter: the user ID of the transferee user. Then, the item transfer module 332 exits the item transfer process. It is assumed that the condition for granting an item is that items have been transferred to the transferee user from a predetermined number of users. Specifically, it is assumed that the condition for granting an item is that the item transfer table stored in the server storage module 32 is referenced with the user ID of the transferee user as a key, the transferee's transfer records are counted, and the resulting count is equal to or greater than a predetermined value. However, other conditions for granting an item may be used as described later.

The item granting module 333 references the item table stored in the server storage module 32, extracts item IDs for the respective items, and selects one of them. In addition, the item granting module 333 references the user table stored in the server storage module 32 and stores the selected item ID as a possessed item, using the given user ID of the transferee user as a key. Furthermore, the item granting module 333 references the user table stored in the server storage module 32 and stores the text data representing that an item has been granted, as a posted message, using the given user ID of the transferee user as a key. Then, the item granting module 333 exits the item granting process. Note that an item ID is selected with equal probability based on pseudo-random numbers generated by a seed which is the present time or the like. However, some other probability or method may be used.

The server processing module 33 creates the display data for the home screen. The server processing module 33 sends the created display data for the home screen to the portable device 2 through the server communication module 31.

Upon receipt of a request for posting a message with the parameters: text data and the like, from the portable device 2 through the server communication module 31, the server processing module 33 instructs the message posting module 334 to carry out a message posting process with the parameters: the received text data and the previously received user ID.

The message posting module 334 references the user table stored in the server storage module 32 and stores the given text data as a posted message, using the given user ID as a key. Then, the message posting module 334 exits the message posting process.

The server processing module 33 creates the display data for the home screen. The server processing module 33 sends the created display data for the home screen to the portable device 2 through the server communication module 31.

Figure 6:
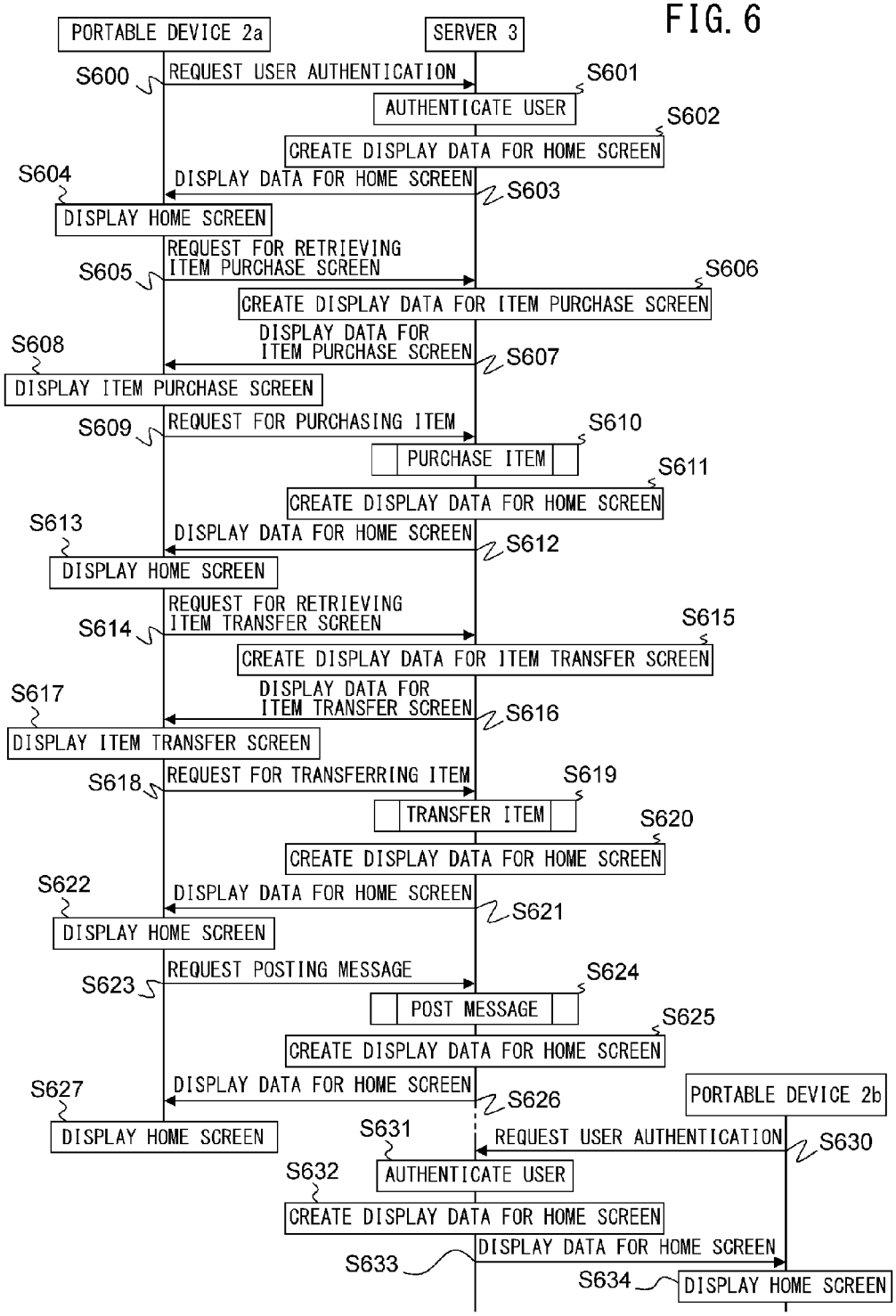
FIG. 6 illustrates an example operational sequence for the communication system.

FIG. 6 illustrates an example operational sequence for the communication system 1.

The device processing module 26 in the portable device 2a instructs the browsing processing module 261 to carry out a screen browsing process. The browsing processing module 261 sends a request for user authentication to the server 3 through the device communication module 21 with the parameters: the user ID and password that have been entered by the user via the operation module 23 (Step S600).

Upon receipt of a request for user authentication with the parameters: the user ID, password, and the like, from the portable device 2a through the server communication module 31, the server processing module 33 instructs the user authentication module (not illustrated) to authenticate the user with the parameters: the received user ID and password (Step S601).

When the user is authenticated by the user authentication module, the server processing module 33 creates the display data for the home screen (Step S602).

The server processing module 33 sends the created display data for the home screen to the portable device 2a through the server communication module 31 (Step S603).

Upon receipt of the display data for the home screen from the server 3 through the device communication module 21, the browsing processing module 261 creates rendering data based on the received display data for the home screen. In addition, the browsing processing module 261 outputs the created rendering data to the display module 24 to display the home screen (Step S604).

When an instruction to retrieve an item purchase screen is given by the user on the home screen via the operation module 23, the browsing processing module 261 sends a request for retrieving an item purchase screen to the server 3 through the device communication module 21 (Step S605).

Upon receipt of the request for retrieving an item purchase screen from the portable device 2a through the server communication module 31, the server processing module 33 creates the display data for the item purchase screen (Step S606).

The server processing module 33 sends the created display data for the item purchase screen to the portable device 2a through the server communication module 31 (Step S607).

Upon receipt of the display data for the item purchase screen from the server 3 through the device communication module 21, the browsing processing module 261 creates rendering data based on the received display data for the item purchase screen. In addition, the browsing processing module 261 outputs the created rendering data to the display module 24 to display the item purchase screen (Step S608).

When an instruction to purchase an item is given by the user on the item purchase screen via the operation module 23, the browsing processing module 261 sends a request for purchasing the item to the server 3 through the device communication module 21 with the parameters: the item ID, the credit card number stored in the device storage module 22, and the like (Step S609).

Upon receipt of a request for purchasing the item with the parameters: the item ID, credit card number, and the like, from the portable device 2a through the server communication module 31, the server processing module 33 instructs the item purchase module 331 to carry out an item purchase process with the parameters: the received item ID and credit card number as well as the previously received user ID (Step S610).

Figure 7A:
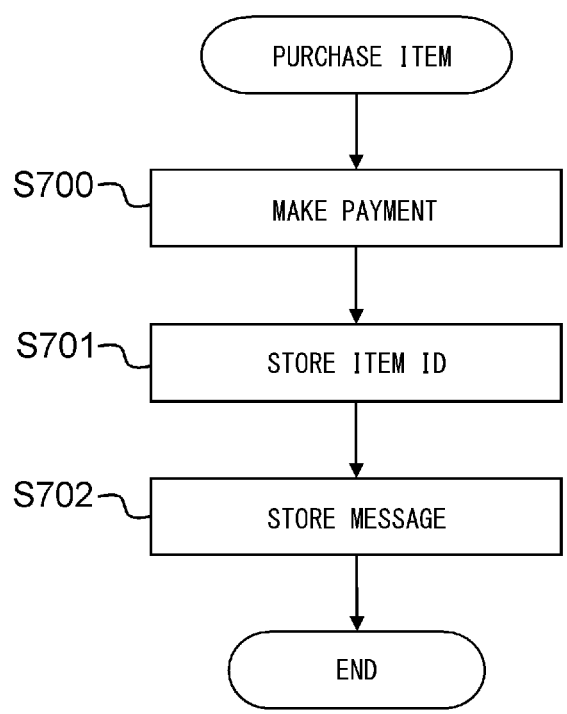
FIG. 7A illustrates an example operational flow for a server processing module.

FIG. 7A represents an example operational flow for the item purchase module 331.

The item purchase module 331 references the item table stored in the server storage module 32 and extracts the price of the item, using the given item ID as a key. The item purchase module 331 then instructs the payment module (not illustrated) to carry out a payment process with the parameters: the extracted price and the given credit card number (Step S700).

When the payment process is completed by the payment module, the item purchase module 331 references the user table stored in the server storage module 32 and stores the given item ID as a possessed item, using the given user ID as a key (Step S701).

The item purchase module 331 references the user table stored in the server storage module 32 and stores the text data representing that the user has purchased an item, as a posted message, using the given user ID as a key (Step S702).

Then, the item purchase module 331 exits the item purchase process.

With reference back to FIG. 6, the server processing module 33 creates the display data for the home screen (Step S611).

The server processing module 33 sends the created display data for the home screen to the portable device 2a through the server communication module 31 (Step S612).

Upon receipt of the display data for the home screen from the server 3 through the device communication module 21, the browsing processing module 261 creates rendering data based on the received display data for the home screen. In addition, the browsing processing module 261 outputs the created rendering data to the display module 24 to display the home screen (Step S613).

When an instruction to retrieve an item transfer screen is given by the user on the home screen via the operation module 23, the browsing processing module 261 sends a request for retrieving an item transfer screen to the server 3 through the device communication module 21 (Step S614).

Upon receipt of the request for retrieving an item transfer screen from the portable device 2a through the server communication module 31, the server processing module 33 creates the display data for the item transfer screen (Step S615).

The server processing module 33 sends the created display data for the item transfer screen to the portable device 2a through the server communication module 31 (Step S616).

Upon receipt of the display data for the item transfer screen from the server 3 through the device communication module 21, the browsing processing module 261 creates rendering data based on the received display data for the item transfer screen. In addition, the browsing processing module 261 outputs the created rendering data to the display module 24 to display the item transfer screen (Step S617).

When an instruction to transfer an item is given by the user on the item transfer screen via the operation module 23, the browsing processing module 261 sends a request for transferring the item to the server 3 through the device communication module 21 with the parameters: the item ID, the user ID of the transferee user, and the like (Step S618).

Upon receipt of the request for transferring the item with the parameters: the item ID, the user ID of the transferee user, and the like, from the portable device 2a through the server communication module 31, the server processing module 33 instructs the item transfer module 332 to carry out an item transfer process with the parameters: the received item ID and the user ID of the transferee user as well as the previously received user ID (Step S619).

FIG. 7B represents an example operational flow for the item transfer module 332.

The item transfer module 332 references the user table stored in the server storage module 32 and deletes the given item ID from possessed items, using the given user ID as a key (Step S710).

The item transfer module 332 references the user table stored in the server storage module 32 and stores the text data representing that the user has transferred an item, as a posted message, using the given user ID as a key (Step S711).

The item transfer module 332 references the user table stored in the server storage module 32 and stores the given item ID as a possessed item, using the given user ID of the transferee user as a key (Step S712).

The item transfer module 332 references the user table stored in the server storage module 32 and stores the text data representing that an item has been transferred, as a posted message, using the given user ID of the transferee user as a key (Step S713).

The item transfer module 332 references the item transfer table stored in the server storage 32 and records transfer of an item, using the given user ID and the user ID of the transferee user as keys (Step S714).

When a predetermined condition for granting an item is satisfied with respect to the transferee user (Yes in Step S715), the item transfer module 332 instructs the item granting module 333 to carry out an item granting process with the parameter: the user ID of the transferee user (Step S716). On the other hand, when a predetermined condition for granting an item is not satisfied (No in Step S715), the item transfer module 332 exits the item transfer process.

Figure 7C:
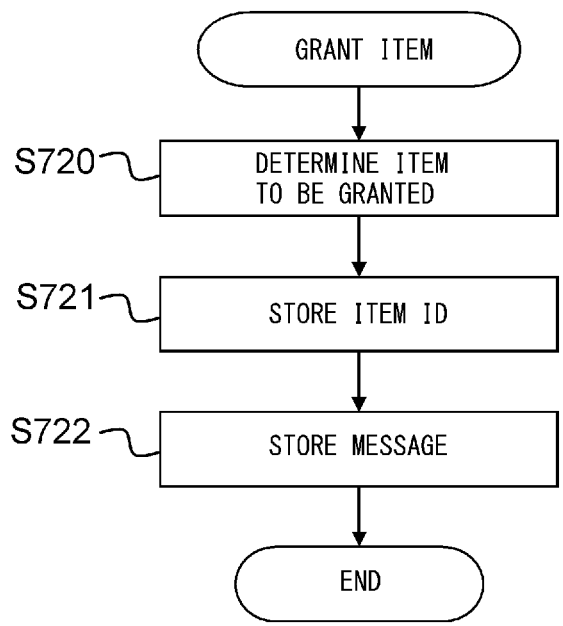
FIG. 7C illustrates an example operational flow for the server processing module.

FIG. 7C represents an example operational flow for the item granting module 333.

The item granting module 333 references the item table stored in the server storage module 32, extracts item IDs for the respective items, and selects one of them (Step S720).

The item granting module 333 references the user table stored in the server storage module 32 and stores the selected item ID as a possessed item, using the given user ID of the transferee user as a key (Step S721).

The item granting module 333 references the user table stored in the server storage module 32 and stores the text data representing that an item has been granted, as a posted message, using the user ID of the transferee user as a key (Step S722).

The item granting module 333 exits the item granting process.

With reference back to FIG. 7B, the item transfer module 332 exits the item transfer process.

With reference back to FIG. 6, the server processing module 33 creates the display data for the home screen (Step S620).

The server processing module 33 sends the created display data for the home screen to the portable device 2a through the server communication module 31 (Step S621).

Upon receipt of the display data for the home screen from the server 3 through the device communication module 21, the browsing processing module 261 creates rendering data based on the received display data for the home screen. In addition, the browsing processing module 261 outputs the created rendering data to the display module 24 to display the home screen (Step S622).

When an instruction to post a message is given by the user on the home screen via the operation module 23, the browsing processing module 261 sends a request for posting a message to the server 3 through the device communication module 21 with the parameters: the text data for the message and the like (Step S623).

Upon receipt of a request for posting a message with the parameters: text data and the like, from the portable device 2a through the server communication module 31, the server processing module 33 instructs the message posting module 334 to carry out a message posting process with the parameters: the received text data and the previously received user ID (Step S624).

Figure 7D:
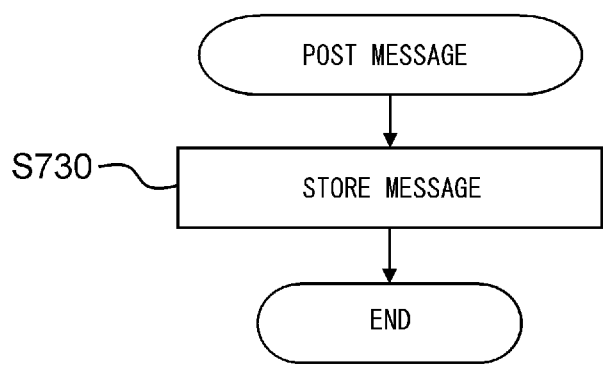
FIG. 7D illustrates an example operational flow for the server processing module.

FIG. 7D represents an example operational flow for the message posting module 334.

The message posting module 334 references the user table stored in the server storage module 32 and stores the given text data as a posted message, using the given user ID as a key (Step S730).

The message posting module 334 exits the message posting process.

With reference back to FIG. 6, the server processing module 33 creates the display data for the home screen (Step S625).

The server processing module 33 sends the created display data for the home screen to the portable device 2a through the server communication module 31 (Step S626).

Upon receipt of the display data for the home screen from the server 3 through the device communication module 21, the browsing processing module 261 creates rendering data based on the received display data for the home screen. In addition, the browsing processing module 261 outputs the created rendering data to the display module 24 to display the home screen (Step S627).

On the other hand, the device processing module 26 in the portable device 2b instructs the browsing processing module 261 to carry out a screen browsing process. The browsing processing module 261 sends a request for user authentication to the server 3 through the device communication module 21 with the parameters: the user ID and password that have been entered by the user via the operation module 23 (Step S630).

Upon receipt of a request for user authentication with the parameters: the user ID, password, and the like, from the portable device 2b through the server communication module 31, the server processing module 33 instructs the user authentication module (not illustrated) to authenticate the user with the parameters: the received user ID and password (Step S631).

When the user is authenticated by the user authentication module, the server processing module 33 creates the display data for the home screen (Step S632).

The server processing module 33 sends the created display data for the home screen to the portable device 2b through the server communication module 31 (Step S633).

Upon receipt of the display data for the home screen from the server 3 through the device communication module 21, the browsing processing module 261 creates rendering data based on the received display data for the home screen. In addition, the browsing processing module 261 outputs the created rendering data to the display module 24 to display the home screen (Step S634). A posted message displayed on the home screen lets the user know an item has been transferred and/or granted.

As described above, this embodiment makes it possible to further encourage users to purchase items or give them as gifts, by determining whether a predetermined condition for granting an item is satisfied with respect to the transferee user when an item is transferred to the transferee in response to a request for transfer, and by granting a predetermined item to the transferee user if the predetermined condition for granting an item is satisfied.

It should be noted that this application is not limited to this embodiment. For example, while this embodiment allows a user to transfer an item to another user, the user may additionally send a message or the like when transferring an item.

Moreover, while this embodiment assumes that the condition for granting an item is that a predetermined number of users have transferred items to the transferee user, other conditions for granting items may be used. For example, the condition for granting items may involve the number and attributes of the transferor users, the number and types of transferred items, a point of time or a period, and combinations thereof.

Furthermore, while this embodiment uses one condition for granting an item, a plurality of conditions may be used. In addition, the user and/or any other user may be notified to what extent each condition for granting an item of the user has been satisfied, and which item would be granted to the user if the condition has been fully satisfied. Moreover, when an item is actually granted to a user, the transferor user who transferred an item to the user may be notified that the item is granted to the user, or the granted user may be recommended to send a message or item to the transferor user.

In this embodiment, the example in which the items are transferred has been described. However, the items may be exchanged.

Second Embodiment

Figure 8:
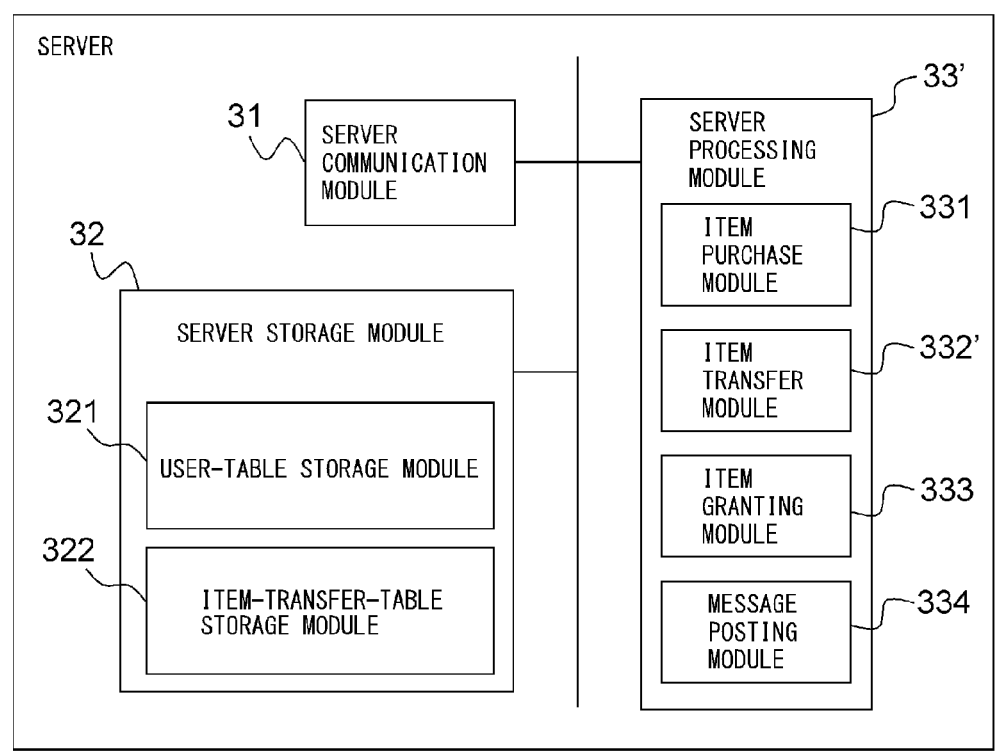
FIG. 8 illustrates an example operational flow for the server processing module.

In the first embodiment, the condition for granting an item is associated with a first-order transfer relationship between users (i.e., transfer from one user to another user). However, the condition for granting an item may be associated with a second-order transfer relationship between users (e.g., transfer to one user from another user to whom the one user transferred an item in the past). FIG. 8 illustrates an example schematic configuration of a server 3' in such communication system 1'. The configurations of the communication system 1' and portable device 2 are identical to those illustrated in FIGS. 1 and 2, and thus their descriptions are omitted below.

The server 3' includes a server communication module 31, a server storage module 32, and a server processing module 33'. The server communication module 31 and server storage module 32 in these configurations are identical to those illustrated in FIG. 3, and thus their descriptions are omitted below.

The server processing module 33' includes an item purchase module 331, an item transfer module 332', an item granting module 333, and a message posting module 334. The item purchase module 331, item granting module 333, and message posting module 334 in these configurations are identical to those illustrated in FIG. 3, and thus their descriptions are omitted below.

Upon receipt of a request for transfer of an item with the parameters: an item ID, transferee user ID, and the like, from the portable device 2 through the server communication module 31, the server processing module 33' instructs the item transfer module 332' to carry out an item transfer process with the parameters: the received item ID and transferee user ID as well as the previously received user ID. The operations of deleting and storing an item ID and storing text data in the item transfer process are identical to those illustrated in FIG. 7B, and thus their descriptions are omitted below.

The item transfer module 332' references the item transfer table stored in the server storage 32 and records transfer of an item (stores "1", for example), using the given user ID and transferee user ID as keys. In addition, when a predetermined condition for granting an item is satisfied with respect to the transferee user, the item transfer module 332' instructs the item granting module 333 to carry out an item granting process with the parameter: the transferee user ID. It is assumed that the condition for granting an item is that items have been transferred to the transferee user from a predetermined number of users to whom the transferee user had transferred items. Specifically, it is assumed that the condition for granting an item is that the item transfer table stored in the server storage module 32 is referenced with the transferee user ID as a key to identify any user to whom the transferee user once transferred an item, and the item transfer table stored in the server storage module 32 is referenced with the identified user ID and the transferee user ID as keys to count item transfer records, and the resulting count is equal to or greater than a predetermined value.

The item transfer module 332' exits the item transfer process.

The server processing module 33' creates data for creating a home screen. The server processing module 33' sends the created display data for the home screen to the portable device 2 through the server communication module 31.

The operational sequence for the communication system 1' and the operational flows for the item purchase module 331, item transfer module 332', item granting module 333, and message posting module 334 are identical to those illustrated in FIGS. 6 and 7, and thus their descriptions are omitted below.

As described above, limiting the condition for granting an item causes users to have a greater zest, making it possible to further encourage users to purchase items or give them as gifts.

It should be noted that this application is not limited to this embodiment. For example, while the condition for granting an item is associated with a second-order transfer relationship between users in this embodiment, the transfer relationship between users may be extended to a third or higher order relationship. For example, the condition for granting an item may be associated with transfer from still another user to one user in the cases where the one user transferred an item to another user, who in turn transferred an item to the still another user.

This application may be applied not only to the communication system and/or item transfers according to this embodiment but also to other services and/or objects that have similar arrangements.

A computer program for implementing the respective functions included in the server processing modules 33 or 33' on a computer may be provided in the form of a record on a semiconductor record medium, a magnetic record medium, an optical record medium, or any other computer-readable record medium, and may be installed into the server storage module 32 from the record medium through the use of a publicly known setup program or the like.

It should be understood that those skilled in the art can make various changes, substitutions, and modifications to the embodiments without departing from the spirit and scope of this application.

REFERENCE SIGNS LIST 1, 1' Communication system
2 Portable device
21 Device communication module
22 Device storage module
23 Operation module
24 Display module
25 Audio output module
26 Device processing module
261 Browsing processing module
3, 3' Server
31 Server communication module
32 Server storage module
321 User-table storage module 322 Item-transfer-table storage module
33, 33' Server processing module
331 Item purchase module
332, 332' Item transfer module
333 Item granting module
334 Message posting module
4 Base station
5 Mobile phone network
6 Gateway
7 Internet

What is claimed is:

1. A server for providing a service to a plurality of devices respectively used by a plurality of users, and communicating with the plurality of devices, the server comprising:
   a storage medium for storing possessed objects respectively possessed by the plurality of users, acquired in the service and used in the service, wherein the storage medium stores, for each of the plurality of users, transfer information indicating a transfer or a user who has transferred an object to any of the plurality of the users;
   a communication module for sending, to a device of a first user among the plurality of users, display data for selecting a first object from the possessed objects possessed by the first user and selecting a second user from the plurality of users, wherein the communication module receives from the device of the first user a request for transfer of the selected first object from the first user to the second user; and
   a processor configured to:
   update the transfer information of the second user in response to the request for transfer, for determining;
   determine whether the transfer information of the second user satisfies a condition for granting a second object when the first object is transferred in response to the request for transfer, for granting;
   grant the second object used in the service to the second user if the transfer information of the second user satisfies the condition for granting the second object; and
   for notifying control notifying the device of the second user that the first object is transferred, or that the second object is granted.

2. The server according to claim 1, wherein the condition for granting the second object includes a condition relating to the number of users who have transferred an object to the second user.

3. The server according to claim 1, wherein the condition for granting the second object includes a condition relating to the number of users who, among those users to whom the second user transferred any object, have transferred an object to the second user.

4. The server according to claim 1, wherein the condition for granting the second object includes a condition relating to an attribute of a user who has transferred an object to the second user.

5. The server according to claim 1, wherein the condition for granting the second object includes a condition relating to the number of or types of objects which have been transferred to the second user.

6. The server according to claim 1, wherein the condition for granting the second object includes a condition relating to a point of time or a period when an object is transferred.

7. A method for controlling a server for providing a service to a plurality of devices respectively used by a plurality of users, including a storage module and a communication module for communicating with the plurality of devices, the method comprising:
   storing possessed objects respectively possessed by the plurality of users, acquired in the service and used in the service in the storage module;
   storing, for each of the plurality of users, transfer information indicating a transfer or a user who has transferred an object to any of the plurality of the users in the storage module;
   sending, to a device of a first user among the plurality of users, display data for selecting a first object from the possessed objects possessed by the first user and selecting a second user from the plurality of users;
   receiving from the device of the first user a request for transfer of the selected first object from the first user to the second user;
   updating the transfer information of the second user in response to the request for transfer;
   determining whether the transfer information of the second user satisfies a condition for granting a second object when the first object is transferred in response to the request for transfer;
   granting, by the server, the second object used in the service to the second user when the transfer information of the second user satisfies the condition for granting the second object; and
   notifying the device of the second user that the first object is transferred, or that the second object is granted.

8. A computer-readable, non-transitory medium storing a control program for a server for providing a service to a plurality of devices respectively used by a plurality of users, including a storage medium and a communication module for communicating with the plurality of devices, wherein the control program causes the server to execute a process, the process comprising:
   storing possessed objects respectively possessed by the plurality of users, acquired in the service and used in the service in the storage module;
   storing, for each of the plurality of users, transfer information indicating a transfer or a user who has transferred an object to any of the plurality of the users in the storage medium;
   sending, to a device of a first user among the plurality of users, display data for selecting a first object from the possessed objects possessed by the first user and selecting a second user from the plurality of users;
   receiving from the device of the first user a request for transfer of the selected first object from the first user to the second user;
   updating the transfer information of the second user in response to the request for transfer;
   determining whether the transfer information of the second user satisfies a condition for granting a second object when the first object is transferred in response to the request for transfer;
   granting the second object used in the services to the second user when the transfer information of the second user satisfies the condition for granting the second object; and
   notifying the device of the second user that the first object is transferred, or that the second object is granted.

* * * * *